No. 893,343.

PATENTED JULY 14, 1908.

J. MEYER.

APPARATUS FOR THE SUPPLY OF DRINKS OR BEVERAGES.

APPLICATION FILED MAR. 25, 1905.

4 SHEETS—SHEET 1.

Witnesses
Ger. Heinricks
F. Dittmar

Inventor
Josef Meyer
per
G. Dittmar
Attorney

No. 893,343.

PATENTED JULY 14, 1908.

J. MEYER.
APPARATUS FOR THE SUPPLY OF DRINKS OR BEVERAGES.
APPLICATION FILED MAR. 25, 1905.

4 SHEETS—SHEET 2.

Witnesses
Ger. Heinicke
F. Dittmar

Inventor
Josef Meyer
per
G. Dittmar
Attorney

No. 893,343. PATENTED JULY 14, 1908.
J. MEYER.
APPARATUS FOR THE SUPPLY OF DRINKS OR BEVERAGES.
APPLICATION FILED MAR. 25, 1905.

4 SHEETS—SHEET 3.

Witnesses
Inventor
Josef Meyer
per
G. Dittmar
Attorney

No. 893,343. PATENTED JULY 14, 1908.
J. MEYER.
APPARATUS FOR THE SUPPLY OF DRINKS OR BEVERAGES.
APPLICATION FILED MAR. 25, 1905.

4 SHEETS—SHEET 4.

Witnesses

Inventor
Josef Meyer
per G. Dittman
Attorney.

UNITED STATES PATENT OFFICE.

JOSEF MEYER, OF COLOGNE, GERMANY.

APPARATUS FOR THE SUPPLY OF DRINKS OR BEVERAGES.

No. 893,343.   Specification of Letters Patent.   Patented July 14, 1908.

Application filed March 25, 1905. Serial No. 252,037.

*To all whom it may concern:*

Be it known that I, JOSEF MEYER, a subject of the King of Prussia, German Emperor, residing at Cologne-on-the-Rhine, in the Province of the Rhine, Kingdom of Prussia, German Empire, have invented a new and useful Improvement in Apparatus for the Supply of Drinks or Beverages, of which the following is a specification.

This invention relates to coin-freed apparatus or serving counters for the supply of drinks, and consists especially in the devices for operating the several valves which control the several pipes or channels, for the supply of the several essences or additional liquids (syrups and the like) to the carbonic acid water (soda water), and in various other novelties which will be described hereinafter.

The apparatus is shown in the accompanying drawings in which

Figure 1:
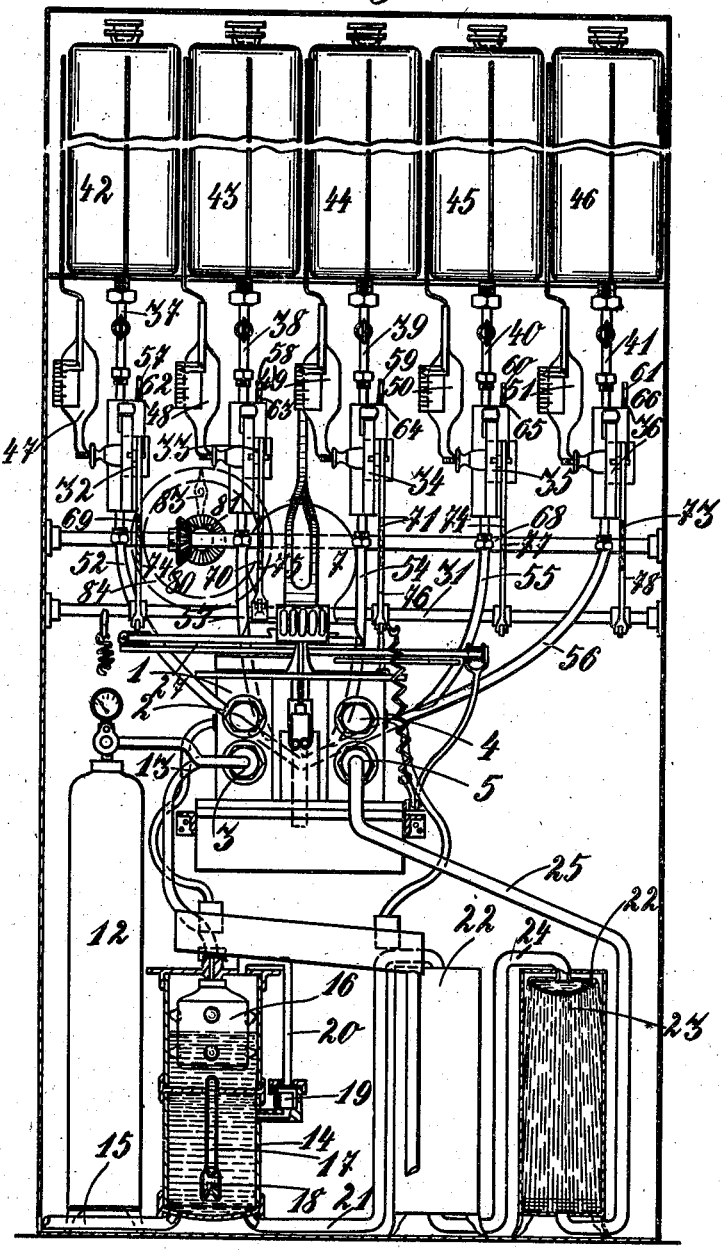
Figure 2:
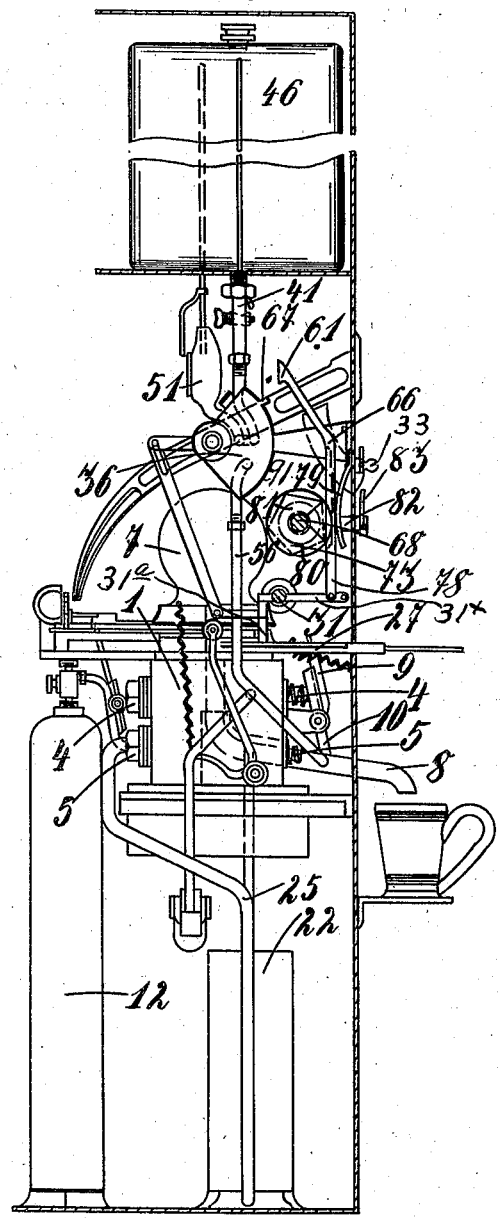
Figure 3:
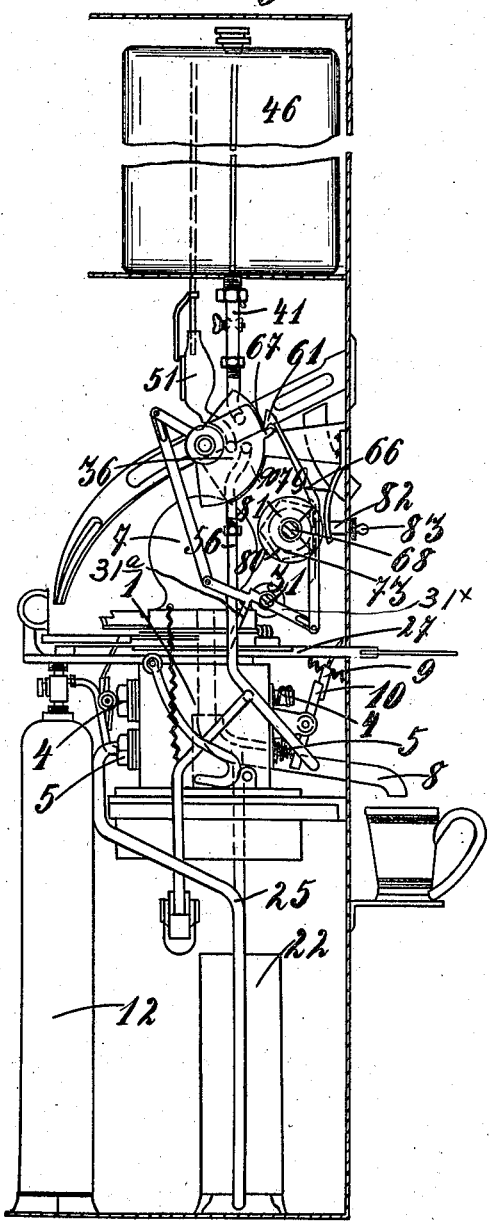
Figure 4:
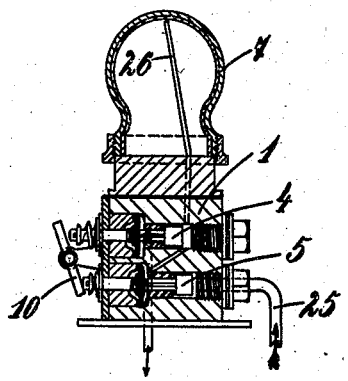
Figure 5:
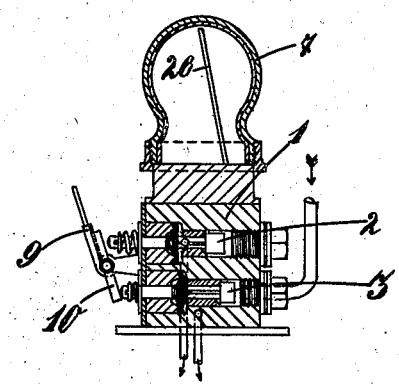
Figure 6:
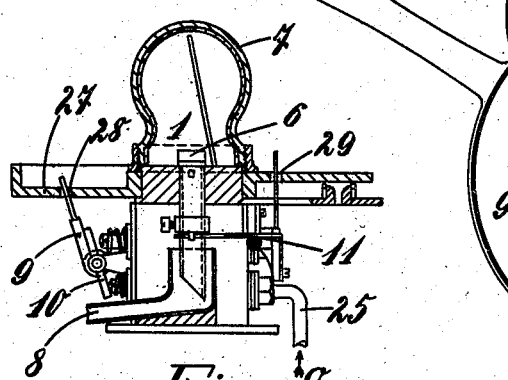
Figure 7:
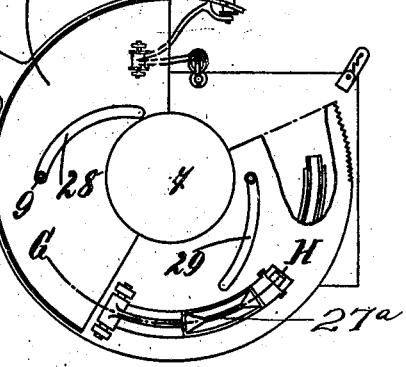
Figure 8:
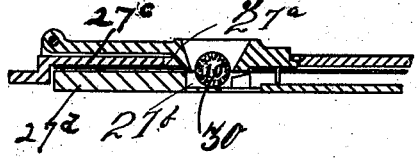
Figure 9:
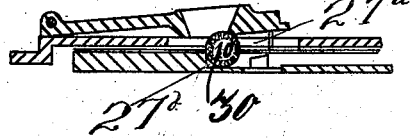
Figure 10:
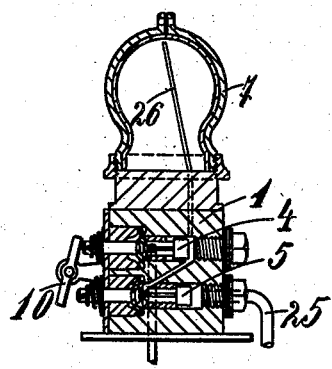
Figure 11:
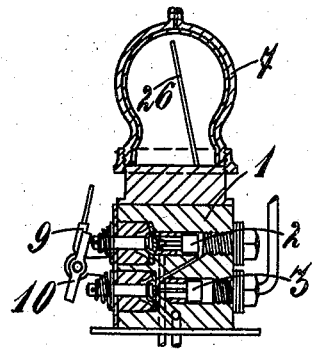
Figure 12:
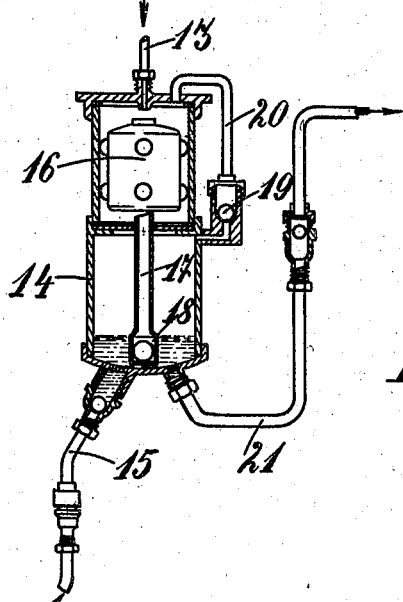

Figure 1 is a rear view, Fig. 2 a side elevation, and Fig. 3 a corresponding side elevation with the movable parts in another position. Fig. 4 is a vertical section through the valve casing which contains the valves for cutting off and opening the various pipes or canals together with the measuring devices. Fig. 5 is a vertical section through the valve casing. Fig. 6 is an intermediate vertical section. Fig. 7 is a plan view of the disk which serves to give the various motions. Fig. 8 is a section on the curved line G—H of Fig. 7 through the part of said disk which receives the coins. Fig. 9 shows the same parts in a different position. Fig. 10 is a section as Fig. 4 showing another position of the movable parts. Fig. 11 is a section as Fig. 5 with another position of the movable parts. Fig. 12 is a vertical section through the mixing receptacle, showing the automatic valves. Figs. 13–16 show the construction of one of the devices for controlling the outflow of the essences.

1 is the valve casing which contains four valves 2, 3, 4 and 5. These valves are of the ordinary construction in this class of devices as will readily be seen upon reference to Figs. 4, 5 and 6, the liquid or gas being allowed to escape when the valves are in proper position. Beside these there is a fifth valve 6 (see Fig. 6) which latter effects the connection of the measuring vessel 7 for the carbonic acid water with the outflow passage 8. The four valves 2, 3, 4, 5 are positively controlled by the lever 9. The said lever is rigidly connected with a rocker 10 which extends laterally so as to engage the two upper, or the lower valve stems, and according to the position of the lever 9, operates on the valves 2, 3, 4, 5 two by two so that in the one position (Fig. 2) the two upper valves 2 and 4 are pressed in, while in the other position (Fig. 3) the two lower valves 3 and 5 are pressed. The valve spindles tend to stand outwards under spring action. These four valves serve to control the several passages or pipes which are utilized in the making of the soda water (carbonic acid water). The valve 6 is actuated by a spring 11 as will be described later. The preliminary mixer 14 has a solid horizontal partition dividing the same into an upper and lower compartment, as seen clearly in Fig. 12. Through this compartment extends the tube 17 having an enlarged lower end forming a rose 18. In the said enlarged end of the tube is located a ball valve which will close against upward pressure but will open for the escape of liquid and gas from the upper compartment.

The carbonic acid comes from a bottle 12, and when the valve is in the proper position said carbonic acid passes through pipe 13 to the mixing receptacle 14. Fresh water enters this receptacle through a pipe 15. The float 16 closes the mouth of the pipe 13 when the proper amount of water has entered. The carbonic acid gas depresses the float, permeates the water in passing through the upper perforated end of tube 17, and then passes upward through the water in escaping through the rose 18. 19 is an escapement valve the casing of which is connected by pipe 20 with the space above the obstructing float 16. Now when the water is turned on in pipe 15, it will fill the lower compartment in 14 and will then pass up through the pipe 20 by the check valve 19 into the upper compartment until the float 16 closes the end of the pipe 13. During this flow the pipe 13 through the valve casing 1 connects with the atmosphere for the escape of the air in the part 14. Compressed carbonic acid gas is now turned on through the pipe 13 and the float 16 is depressed, the gas then passed down through the tube 17 and the rose 18 and is disseminated throughout the water in the receptacle.

The water heavily charged with carbonic acid goes out through pipe 21 to a device which serves for the internal mixing of the carbonic acid with the water. Evidently there must be automatic valves in the pipes 15 and 21 as shown in Fig. 12 of the drawings. The device for the internal mixing consists of several (two in the drawings) receptacles 22, the inner arrangements of which may be seen from the right hand receptacle in Fig. 1. In each receptacle 22 a rose nozzle 23 is provided, through which the water charged with carbonic acid is allowed to fall; by this means the water is caused to stream in a finely divided state through the carbonic acid under pressure in each receptacle, and must in turn give up some of its carbonic acid, so that an internal mixing and spreading ready for the next period takes place. From the first receptacle 22 the water already somewhat carbonated passes by pipe 24 into the second receptacle 22, and thence through pipe 25 to the valve casing 1. Evidently, there might be any desired number of receptacles 22 connected in succession.

When the valves are in the right position the prepared soda water passes out from the casing 1 through pipe 26 and out at the top thereof into the measuring vessel 7, and is taken away from said vessel by the valve 6 already mentioned. It should be noted that in another position of the valves the pipes 25 and 26 serve to allow of the escape of gas from the upper portion of the vessel 7 downward to the atmosphere.

The movement of the lever 9 is effected by the disk 27 shown best in Figs. 7, 8 and 9, which disk moves to and fro the lever 9 by means of an eccentric slot 28 as said disk is turned. Another eccentric slot 29 serves for the movement of spring 11 and thereby also of the outlet valve 6 already mentioned. The disk 27 is mounted on the base which supports the measuring vessel 7, as seen best in Fig. 6.

The turning of the disk 27 can only take place when a coin 30 is inserted (Figs. 8 and 9). This is insured by a suitable releasing arrangement such as that shown in Figs. 8 and 9 and embodying a coin-slot $27^a$ in the plate $27^c$, and a shoulder $27^b$ on the lower plate $27^d$ to engage the coin, as will be clearly understood from Figs. 8 and 9, where the parts will be seen in their two positions, the one part being mounted for movement on the other. Further, care is taken to insure that both the forward and backward movements of the disk shall be fully made.

Figures 13, 14:
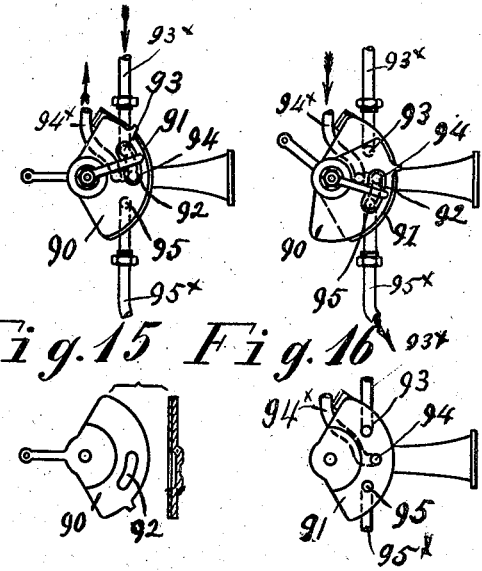
Figures 15, 16:
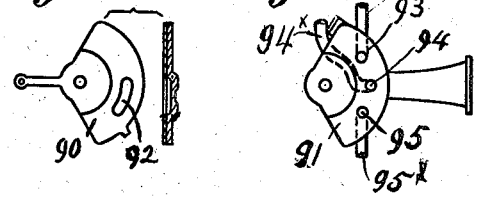

The disk 27 serves also for moving a shaft 31. The shaft 31 is connected by the link $31^\times$ with the upright rod 78, and the member $31^a$ connects said shaft 31 and the disk 27, as seen in Figs. 2 and 3. The object of this is to connect the receptacles which contain the respective essences (such as raspberry syrup, strawberry syrup and so forth) by suitable means with the outflow pipe 8, so that any selected fruit essence or the like may flow out. This device is as follows:—32, 33, 34, 35 and 36 are regulating devices of suitable kind the object of which is to connect the pipes 37, 38, 39, 40 and 41 leading from the respective essence or syrup reservoirs 42, 43, 44, 45 and 46, on the one hand with the measuring flasks 47, 48, 49, 50 and 51, and on the other hand to connect said flasks with the pipes 52, 53, 54, 55, 56 all of which discharge into the outlet pipe 8. For this object these regulating devices are formed, as is shown in the drawings, with sector-shaped plates 90 which turn upon stationary plates 91 of similar form, in which plates canals 92, 93, 94 and 95 are formed adapted to make the required connections by these movements. The canal 93 connects with the pipe $93^\times$, the canal 94 with the pipe $94^\times$, the canal 95 with the pipe $95^\times$, as seen in Figs. 13, 14 and 16. At one position of the apparatus the syrup reservoirs are connected up with the measuring flasks and at another position the outlet from the syrup reservoirs is cut off and the outlet of the flask is connected up with the pipe leading to the spout L. Each regulating device comes into operation as soon as one of a set of hooks 57, 58, 59, 60 and 61 (Figs. 1, 2 and 3) is moved downward. For this object levers 62, 63, 64, 65 and 66 are arranged before the respective regulating devices, and on the turning of the shaft 31 the levers will be moved upward, pushing upward the hooks 57, 58, 59, 60 and 61 of the respective regulating devices, which are returned to their original position by the projections 67, when the latter are brought by the reverse movement of said shaft within reach of the hooks. This however is not the normal condition.

On shaft 68 are fixed disks 69, 70, 71, 72 and 73 each of which is provided with a flattened part; the flats are at an angle to one another on the respective disks as seen in Figs. 2 and 3. Levers 74, 75, 76, 77 and 78 are pressed against these disks by springs 79, but a projection 67 can only come within reach of a nose 61 when the lever 74, 75, 76, 77 or 78 is opposite to a flat on its respective disk. Normally the levers 74, 75, 76, 77 and 78 rest against the unflattened parts of the disks.

The shaft 68 is geared by miter wheels 80, 81, to shaft 82 of the pointer 83 which moves over the different indications of names of drinks on the disk 84. If the pointer 83 stands at "Seltzerwater" all the disks 69, 70, 71, 72, and 73 are so placed that there is not a flat in front of any one of the levers 74, 75, 76, 77, 78 so that on operating the apparatus none of the regulating devices are moved. Consequently only seltzerwater is delivered. If the pointer 83 stands at the indication "Raspberry drink" the flat part of that disk which controls the respective one of the levers 74, 75, 76, 77, 78 which operates the regulating device required comes to the forward position. The outflow pipe of this regulating device then sends down raspberry syrup to the common outlet 8 from which at the same time soda water is discharged, so that a raspberry drink is made. The delivering of other drinks takes place in the same manner. It is hence only necessary to set the indicator to the name of a drank, before or after inserting a coin, and to turn the operating handle, in order to receive the desired drink.

Claims

1. In an apparatus for the supply of drinks containing carbonic acid, the combination of means for supplying water and carbonic acid, means for mixing such water and carbonic acid, means for taking off the drink, a valve-casing and connecting channels, valves within said casing for controlling said channels, a lever for controlling said valves, and means for actuating said lever, and for controlling said lever together with the outflow, essence receptacles, and means for selecting the essence and delivering it to the outflow-pipe.

2. In an apparatus for the supply of drinks containing carbonic acid, the combination of means for supplying water and carbonic acid, means for mixing such water and carbonic acid, means for taking off the drink, a valve-casing and connecting channels, valves within said casing for controlling said channels, a lever for controlling said valves, and means for actuating said lever, and for controlling said lever together with the outflow, essence receptacles, and means for selecting the essence and delivering it to the outflow-pipe, and an indicator to determine the essence to be delivered.

3. In an apparatus for the supply of drinks containing carbonic acid, the combination with a plurality of reservoirs and their discharge pipes, of regulating devices, measuring flasks, an outlet pipe common to all of said flasks, said regulating devices being provided with sector-shaped plates, stationary plates, canals in said plates, hooks, levers, a shaft for operating them simultaneously, and projections for coöperation with said hooks.

In testimony whereof I have signed my name to this specification in the presence of two subscribing witnesses:

JOSEF MEYER.

Witnesses:
   THEODOR HEESE,
   GEORG PEMPE.